TELEPHONE RINGING CIRCUITS
Filed June 27, 1963
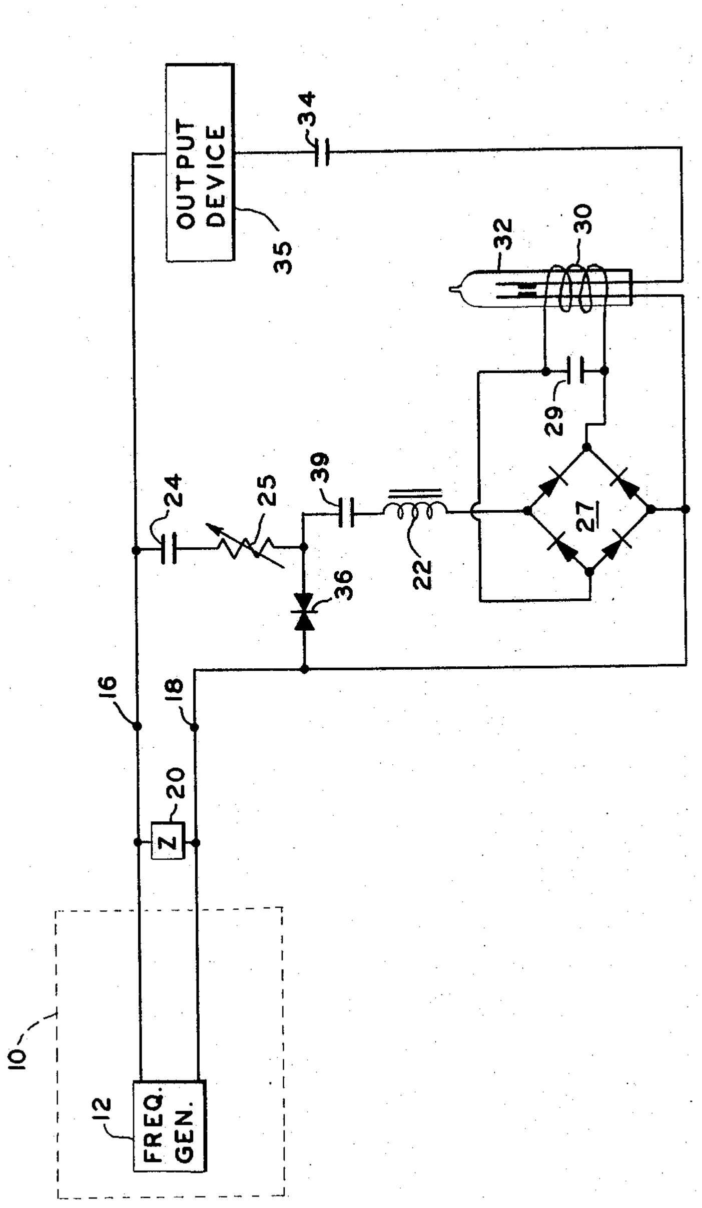
INVENTOR
CHARLES W. CARTER
BY Watson, Cole, Grindle & Watson
ATTORNEYS 3,300,589
TELEPHONE RINGING CIRCUITS
Charles W. Carter, Charlottesville, Va., assignor to Stromberg-Carlson Corporation, a corporation of Delaware
Filed June 27, 1963, Ser. No. 291,087
3 Claims. (Cl. 179—87)

This invention relates to subscriber station selection circuits in telephone systems and more particularly, it relates to ringing circuits for telephone lines using the multi-frequency system of selective signalling.

Telephone systems adapted for selective signalling of a plurality of parties on a line using tones are well known as indicated for example, by U.S. Patent No. 3,026,377, issued March 20, 1962, to John L. Sullivan. These systems have led to development of filters and frequency selective circuits for detecting one of a plurality of tone signals comprising a series of spaced narrow audio ranges which are presented on the telephone line. Such detection and filtering circuits in the prior art have not been fully satisfactory in that they have introduced substantial signal losses, requiring amplifier circuits, or have otherwise been incompatible with existing telephone line requirements.

Thus, an acceptable circuit must include various desirable characteristics including the following:

(1) There should be immunity to noise impulse surges on the line which might cause spurious responses, and particularly to those which are either of high enough amplitude or of such frequency that they might cause brute force operation of ringing circuits.

(2) The loading to the line must be compatible with existing ringing circuits and power requirements such that the ringing circuit is operable with standard lines.

(3) Size should be compatible with existing telephone sets.

(4) The components used must be stable over long periods of operation without servicing or change of performance characteristics.

(5) There must be immunity to change of filter or tuned circuit performance when ringing loads are introduced.

(6) Tuned filter circuits should be isolated from telephone lines so that they are not frequency dependent in part upon varying inductance or capacity components of telephone circuits.

(7) Circuits must be operable in presence of considerable vibration.

(8) The ringing circuit must be simple and economical to use.

Accordingly, it is a general object of the invention to provide an improved ringing circuit for telephone systems.

It is a further object of the invention to provide a ringing circuit satisfying the hereinbefore mentioned criteria.

Another object of the invention is to provide a party line ringing circuit that does not hum or buzz when another party is being signalled.

In accordance with the invention, therefore, a frequency sensitive circuit is employed utilizing a series tuned resonant circuit which supplies current for operation of a glass enclosed magnetic reed relay contact. The circuit is isolated from the telephone line by employment of a shunted Zener diode also serving to filter out spurious surges. A more detailed description of the circuits provided in accordance with the invention, together with additional objects and features of advantage is made with reference to the accompanying single figure of the drawing illustrating a schematic circuit embodiment of the invention.

In the drawing, the box 10 typifies a central office installation wherein a ringing source 12 is provided for supplying a fixed ringing frequency. A variable impedance component 20 appears on the line circuit, whose value depends upon the connections in circuit, length of line and such other variations encountered in a telephone system.

The ringing signal detector circuit comprises a series resonant circuit primarily dependent for its tuned frequency upon capacitor 39 and inductor 22. A blocking capacitor 24 isolates the resonant circuit from any possible direct current component on the line, but passes the ringing frequency supplied from frequency generator 12. To compensate locally for variations from nominal voltage, which varies with the length and loading of the telephone line, the variable resistor 25 is provided to make a local compensating adjustment.

The full wave rectifier 27 and smoothing capacitor 29 convert alternating current through the resonant circuit into a direct current through the relay coil 30. The glass enclosed magnetic reed relay contacts 32 are therefore designed for closure in the presence of current flow through the resonant circuit 20–22 to actuate the output device 35 when a ringing signal of only the proper frequency occurs. The output device may be a tone generator or a power relay operated by closure of the reed relay contacts to thereby complete the ringing or signalling operation. The output circuit contains blocking capacitor 34 for blocking direct current, so that the power from the lines 16–18 is used for operating the output circuit 35.

It is to be noted that with this improved ringing circuit, no buzzing or hum is introduced on a party line which might signal eavesdroppers, resulting in unfavorable line loading.

A double anode Zener diode 36 is provided shunting the resonant circuit 39–22–27. This serves as a limiter for preventing high transient voltage surges, and any high voltage frequencies above the resonance value causing spurious responses by brute force operation. The impedance of this diode is low enough to provide a low impedance path around the resonant circuit (as traced through rectifier 27) so that the variables of the telephone line circuit traced through resistor 25, capacitor 24 and impedance 20 are essentially excluded. Thus, changes in line conditions do not materially affect the tuned frequency of the series resonant circuit 39–22.

Typical operating values for the components as used in a conventional telephone system of 33⅓ c.p.s. ringing voltage are as follows:

| | |
|---|---|
| Capacitor **24** | 0.47 μfd. |
| Capacitor **39**[1] | 0.433 μfd. |
| Inductor **22** | 35 henries, 15 ma. D.C. |
| Resistor **25** | 10 kΩ to 25 kΩ. |
| Zener diode **36** | Type 14 v. double anode. |
| Rectifiers **27** | Type IN–603. |
| Reed contacts **32** | Wintronics HK–222 reed relay. |

[1] Capacity value as required by frequency used.

In operation, this unit may be physically sized to replace the conventional telephone ringer where the utilization device may be an audio oscillator and sound reproducer All the power required is developed from the incoming telephone ringing signal.

It is important in tuned filter circuits to prevent detuning. In this circuit, use of the magnetic reed relay 30 and 32 helps assure this since the inductance of the coil 30 does not significantly change with contact position, as compared with a standard relay having an open and closed magnetic path. Also, the operating power is materially reduced, and operating reliability over long periods of time is assured, since no dust is effective to change contact closure performance and dimensional variations are essentially precluded.

No interference is encountered with adjacent frequency tones, and line loading at both ringing and voice frequencies is equal to conventional high impedance ringers. Thus, the novel ringing circuit defined in the following claims provides an improved performance with many advantages over prior ringing circuits.

I claim:

1. A telephone ringing circuit for use in a multi-frequency system of selective signalling providing a set of low voltage ringing signals of different individual frequencies comprising in combination, a pair of telephone line conductors, a tuned series resonant circuit coupled between the lines tuned to a single of said ringing signals, limiting means connected in shunt with the resonant circuit, means coupled in series with said resonant circuit to rectify current flowing through said resonant circuit during the presence of one of the frequencies on the line at its resonant frequency, magnetic reed relay means including a coil operable to close a set of contacts by D.C. current flow therethrough coupled for closing said set of contacts by said D.C. current flow derived from said resonant circuit during the presence of said rectified current produced by said means coupled to rectify current and an audible output device coupled to said line for energization when said contacts are closed.

2. A circuit as defined in claim 1 wherein a double anode Zener diode is coupled in parallel across the series combination of the series resonant circuit and the rectifying means.

3. A telephone ringing circuit coupled across two telephone ringing lines providing a set of low voltage ringing signals of different frequencies comprising in combination, a series circuit including a blocking capacitor, a variable resistance, a series resonant circuit and a rectifier, wherein a Zener diode device is coupled in parallel circuit with the series resonant circuit to break down and shunt high voltages around said resonant circuit, a magnetic relay device including a coil and a set of glass enclosed magnetic reed contacts closed by D.C. current passing through said coil, a circuit including said rectifier coupled for operation to close said contacts during the presence of rectified current flow through the series resonant circuit in response to a ringing signal of the frequency at which the resonant circuit is tuned and a ringing device coupled by the reed contacts to said line for energization during the presence of the ringing signal at said resonant circuit frequency.

References Cited by the Examiner

UNITED STATES PATENTS

| | | | |
|---|---|---|---|
| 1,933,680 | 11/1933 | Ohl | 179—87 |
| 2,604,545 | 7/1952 | Inglis et al. | 179—87 |
| 2,763,726 | 9/1956 | Weller | 179—84 |
| 3,026,377 | 3/1962 | Sullivan | 179—87 |
| 3,156,775 | 11/1964 | Ioakimidis et al. | 179—84 |
| 3,230,316 | 1/1966 | Hunt | 179—87 |

KATHLEEN H. CLAFFY, *Primary Examiner.*

H. ZELLER, *Assistant Examiner.*